United States Patent [19]
Dewey

[11] Patent Number: 5,937,960
[45] Date of Patent: Aug. 17, 1999

[54] ENGINE AIR RAIL

[75] Inventor: Dallas D. Dewey, Hicksville, Ohio

[73] Assignee: Navistar International Transportation Corp., Chicago, Ill.

[21] Appl. No.: 08/938,774

[22] Filed: Sep. 26, 1997

[51] Int. Cl.[6] .................................................. S02M 35/00
[52] U.S. Cl. ........................ 180/68.3; 123/198 R; 123/26
[58] Field of Search .................... 123/26, 198 R, 123/198 C; 60/304, 305, 453; 180/68.3, 68.2, 68.1

[56] References Cited

U.S. PATENT DOCUMENTS 3,948,229   4/1976   Abthoff .
4,545,331  10/1985   Ito .
5,629,873   5/1997   Mittal .

Primary Examiner—Richard M. Camby
Attorney, Agent, or Firm—Jeffrey P. Calfa; Dennis K. Sullivan

[57] ABSTRACT

The air rail comprises a housing defining an air passageway conduit therein. The conduit has a plurality of passageways therethrough with access to the passageways provided by a plurality of ports disposed in the housing, the main passageway being fed pressurized air from an air compressor discharge and discharging to the brake reservoir. A second passageway acts as a sensing and secondary air supply passageway, the outlet ports from this second passageway being engageable in a push to connect manner with air tubing leading to various air-using systems and devices, the outlets each being positioned as close as possible to the corresponding structure to which it is to be engaged. Further, the air rail may incorporate a fuel oil passageway therein, thereby providing for pre-warming of fuel for the engine.

21 Claims, 5 Drawing Sheets

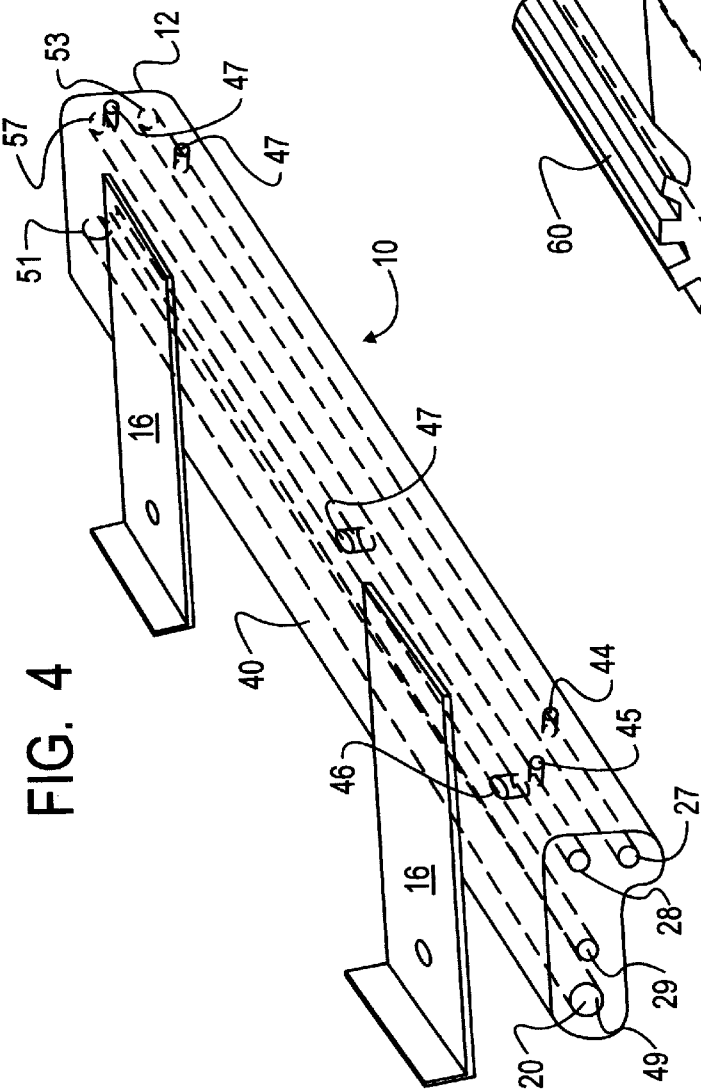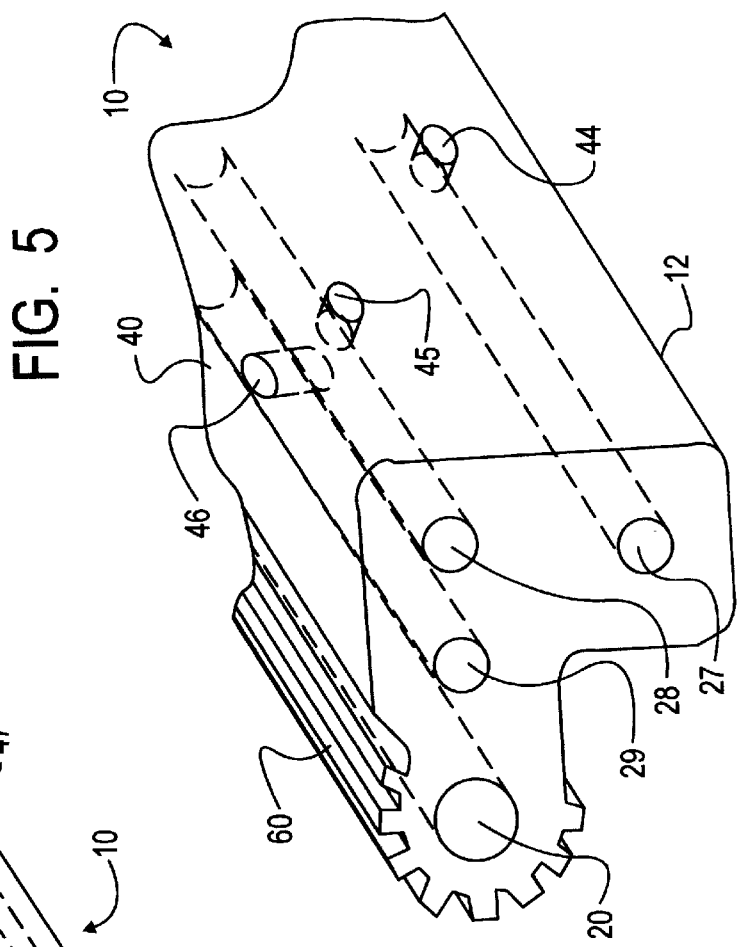

ENGINE AIR RAIL

BACKGROUND OF THE INVENTION

The present invention relates to an air rail externally mounted to a vehicle engine, the air rail comprising an elongated air passageway conduit for replacing complicated, ever changing embodiments of air compressor discharge tubes, governor lines, etc., simply and economically, with ports thereof being engageable in a simplified, economical manner, as well.

PRIOR ART

Heretofore, vehicle engines have included a complicated tangle of engine specific embodiments of air tubes or hoses which supply air from the external ports of an engine mounted air compressor to various air operated systems and air requiring components and devices which are generally mounted on the associated vehicle. Examples of these air-using devices include air brakes, air suspensions, and the air compressor governor.

Manufacture of such engine specific tubing embodiments is expensive and the number of connectors required to engage the tubing appropriately is costly, with a significant amount of labor being required as well in creating such functional connections.

Such complex, ever changing prior art systems are not and cannot be easily dealt with.

SUMMARY OF THE INVENTION

Accordingly, it is a primary object of the invention to provide a simple, easily adaptable air passageway containing structure which will channel the required air flow to air-using devices in a simpler and more economical manner.

It is a further object to provide an engine mounted elongated air passageway containing structure which is independent of the combustion air passageways of the engine to supply air from the air compressor outlet ports to the various air operated devices.

These as well as other objects are specifically met by the engine air rail of the present invention which comprises an engine mounted housing defining an elongated air passageway containing conduit therein extending along the side of the engine, air passageways being run from the forward end of the conduit to the rear end of the conduit with a plurality of ports connected to the various passageways at convenient locations along the conduit, air entering and exiting the passageways through the pre-defined ports, such ports being configured to easily mate in a push-to-connect manner with desired tubing extending to the cooperating device to be engaged to the port, and a main air supply line running from the forward end of the conduit to the rear end of the conduit connected to an air compressor outlet at the forward end and to the reservoir of the vehicle brake system from the rear end of the conduit.

BRIEF DESCRIPTION OF THE DRAWINGS

Other objects and advantages of the invention will become more apparent upon perusal of the detailed description thereof and upon inspection of the drawings in which:

FIG. 4 is a perspective view of an air rail housing and one embodiment of mounting means therefor.

FIG. 5 is a further enlarged perspective view of a portion of an air rail additionally showing cooling fins about a surface portion of the length of the air rail.

DESCRIPTION OF THE PREFERRED EMBODIMENT

Figure 1:
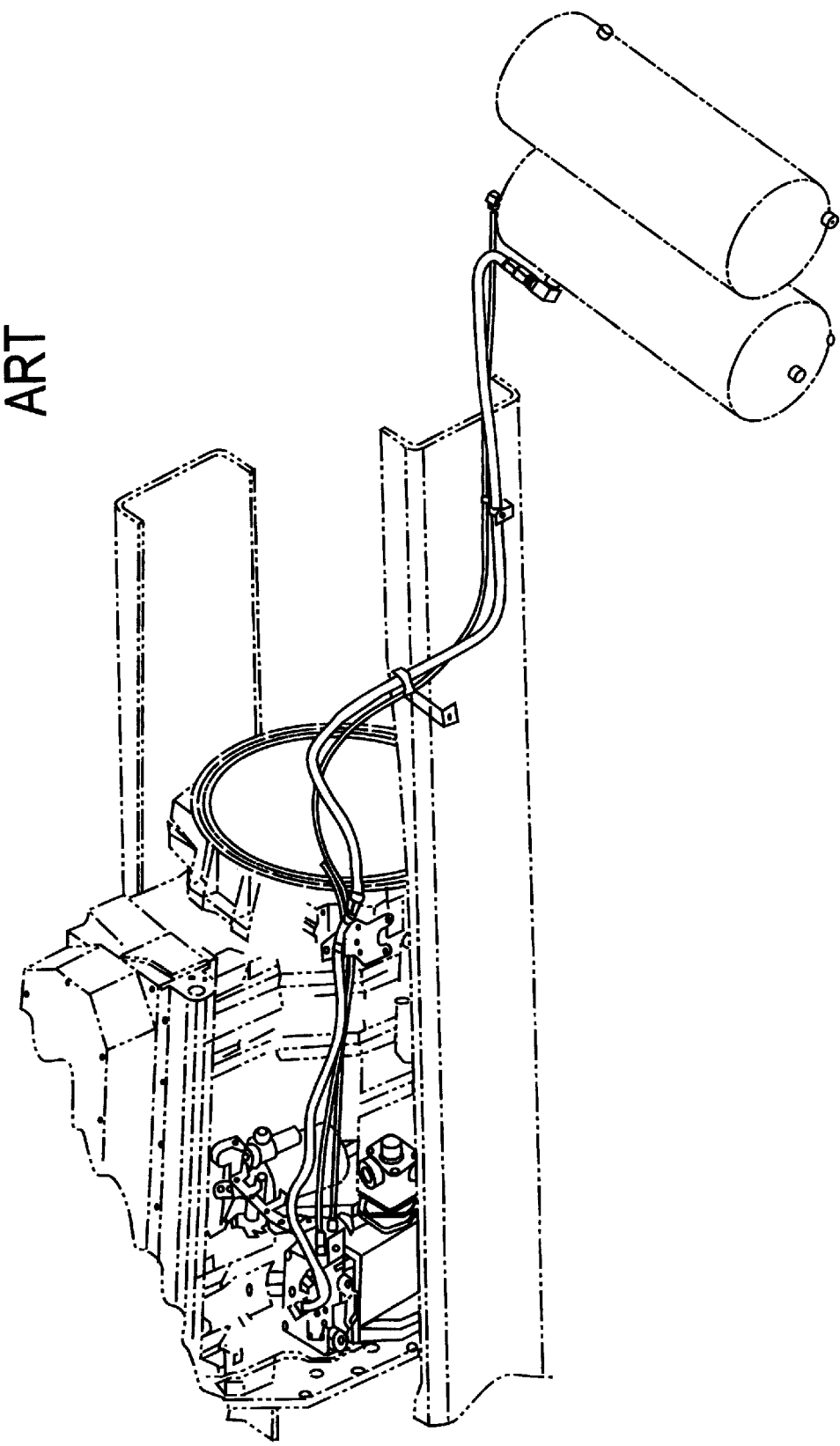
FIG. 1 is a perspective view of a prior art air supply system.
Figure 2:
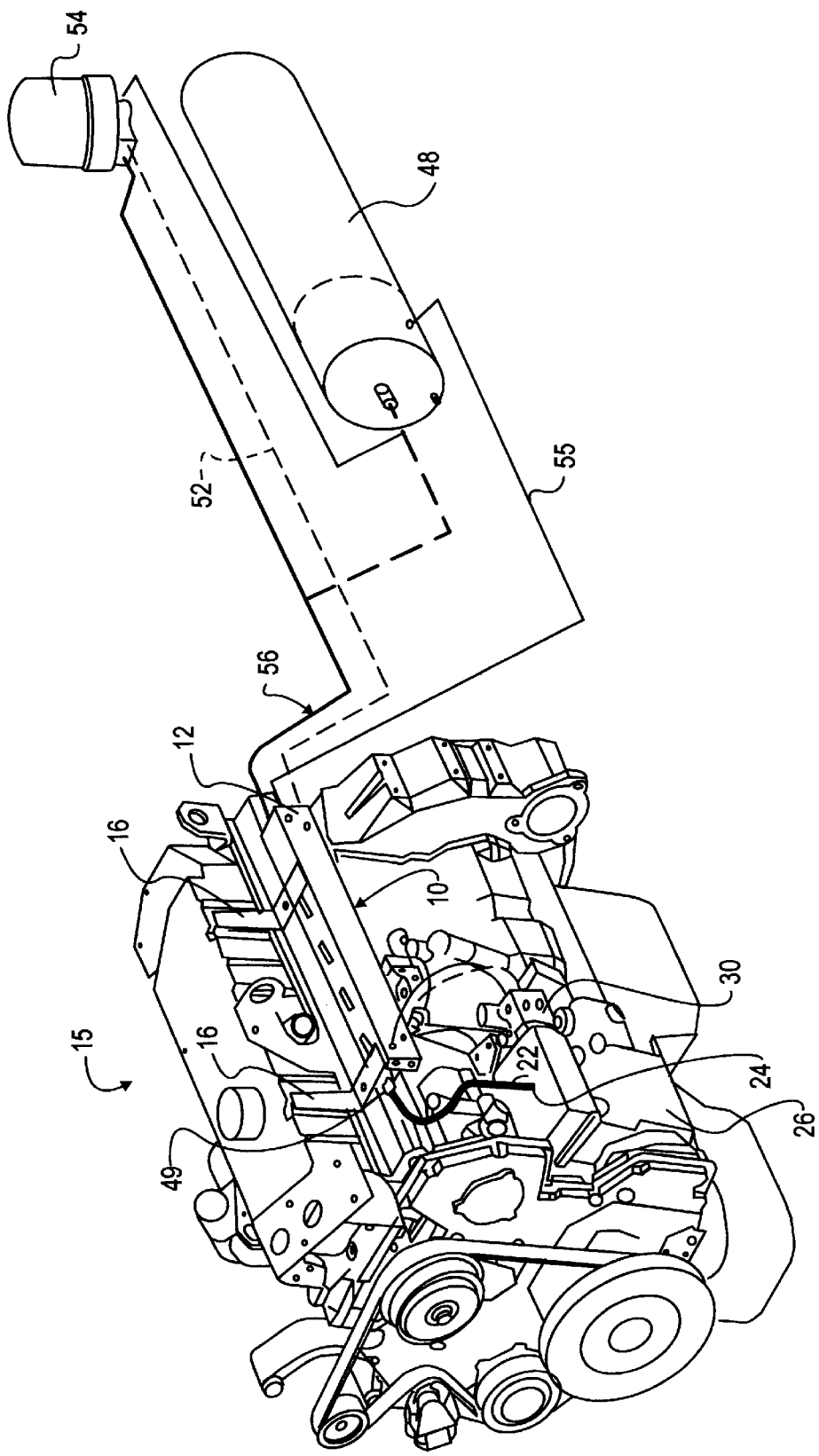
FIG. 2 is a perspective view of an engine having an air rail made in accordance with the teachings of the present invention mounted to a side of an engine and showing various devices engaged thereto.
Figure 3:
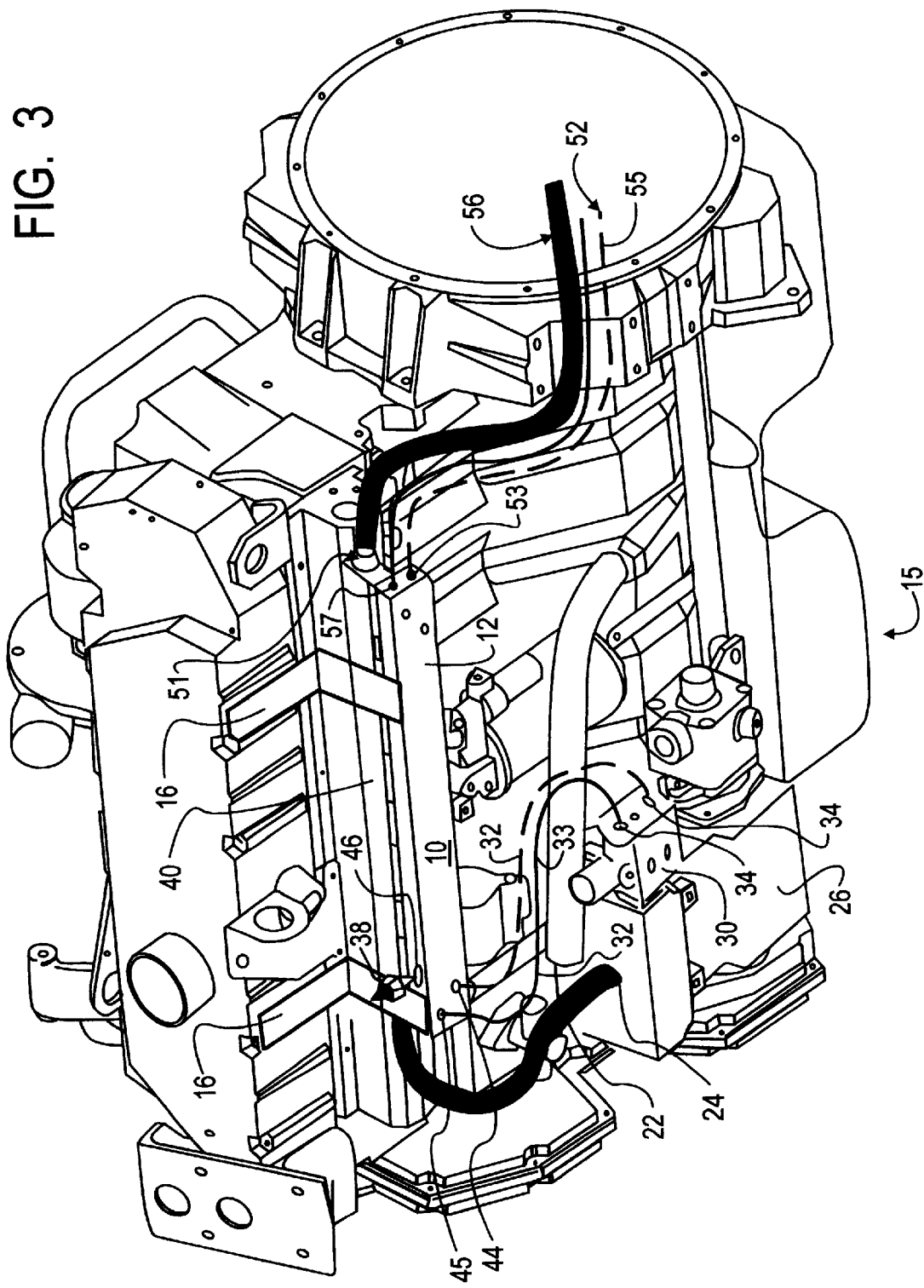
FIG. 3 is an enlarged perspective view of the air rail of FIG. 2 and its engagements.

Referring now to the drawings in greater detail there is illustrated in FIG. 1 a prior art embodiment of an air supply system for a vehicle having an engine including numerous parts, including specifically configured tubing for accommodating connection of the air compressor of the particular engine and auxiliary devices of the engine, as shown.

It will be understood that air supply systems of this type are all engine and device specific, with the connections requiring close tolerances in design and numerous connectors to establish a functional network. Not only does the system require significant man hours and close tolerances for production, but also requires a storehouse of the various embodiments of tubing and connectors. Further, as technology advances, functional embodiments undergo constant change, making stored parts obsolete before they are ever used.

Turning now to FIGS. 2–6, there is illustrated therein a vehicle engine 15 of a vehicle 19 (not shown) having an air rail 10 made in accordance with the teachings of the present invention. The vehicle 19 has air brakes 18 (not shown).

As shown, the air rail 10 comprises a housing 12 defining therein an elongated air passageway conduit 14. The housing 12 is here illustrated as being mounted to the vehicle engine 15 by mounting brackets 16. Alternatively, although not shown, the air rail 10 could be cast integral with the cylinder head or block of the vehicle engine 15 or mounted on the vehicle frame rail 17 (not shown) to which the vehicle engine 15 is mounted.

A plurality of passageways run from the front end of the housing 12 through the conduit 14 to the rear end of the housing 12. Four passageways designated numerals 20, 27, 28, and 29 are shown in FIG. 4 although more or less are envisioned as needed under the invention. Access to the respective passageways inside the conduit 14 within the housing 12 is provided by a plurality of ports disposed in the housing 12 in a predetermined configuration.

A first passageway 20 is a relatively large line in terms of diameter. At the forward end of the housing 12 at an outlet port 49, the first passageway 20 engages an air discharge line 22 connected to an outlet or discharge port 24 of an air compressor 26 mounted to the vehicle engine 15. Air from the air compressor 26 is thus provided through the first passageway 20 and to the rear end of the housing 12. The first passageway 20 ends at the rear end of the housing 12 at an outlet port 51 which is connected to a wet tank supply line 56. The wet tank supply line 56 leads from the housing 12 and first passageway 20 through an air dryer 54, to connect to a brake reservoir 48. The brake reservoir 48 is the source of pressurized air for the air brakes 18 (not shown) of the vehicle 19 (not shown). An alternative path of the wet tank supply line 56 for a version of the invention without the air dryer 54 would be a direct connection between the first passageway 20 of the housing 12 at outlet port 51 and the brake reservoir 48 as shown in phantom.

A second passageway 27 is a relatively small line in terms of diameter. The second passageway 27 is closed at the front end of the housing 12. At the rear end of the housing 12, the second passageway 27 at an outlet port 53 is engaged to an unloader line 52 (in phantom) leading to the unloader port the air dryer 54. An outlet port 44 in the side of the forward portion of the housing 12 is connected through to the second passageway 27. The outlet port 44 is engaged to a governor 30 of the air compressor 26 via connection line 32. Pressure changes in the second passageway 27 and unloader line 52 resulting from cycling of the air compressor 26 cause the air dryer 54 to expel moisture periodically.

A third passageway 28 is a relatively small line in terms of diameter and acts as a sensing and secondary air supply source to air-using components along the length of the vehicle engine 15 as follows. The third passageway 28 is closed at the front end of the housing 12. At the rear end of the housing 12 at an outlet port 57, the third passageway 28 is engaged to a sensing and supply line 55 leading from an air supply portion of the brake reservoir 48. An outlet port 45 is located in the side of and an outlet port 46 is located on the upper surface 40 of the forward portion of the housing 12 and both outlet ports 45 and 46 are connected through to the third passageway 28. The outlet port 45 is operatively engaged to the governor 30 via a line 33 to cause the governor 30 to initiate the air compressor 26 to cycle to raise air pressure in the brake reservoir upon a low pressure condition in the brake reservoir 48. The outlet port 46 serves as a seat for a low air pressure switch 38, the low air pressure switch port 46 being positioned at a pre-selected location on an upper surface 40 of the housing 12.

Any desired number of additional outlet ports 47 may be provided at suitable locations along the length of the housing 12 and connecting to the third passageway 28 to accommodate engagement of various air-using devices and systems of the vehicle 19. The pressurized air is then fed to the various air-using systems and devices disposed on the vehicle 19 in a manner to provide the shortest possible outlet air lines and uncluttering the engine compartment of the vehicle as much as possible. Examples of truck air-using devices and systems include fan clutches, shutter assemblies, horns, etc.

To eliminate the requirement for numerous prior art brass and steel fittings, as well as to eliminate the labor involved in creating engagements using such fittings, the outlet ports 44, 45, 46, 47, 49, 51, 53, and 57 of the air rail 10 may be configured to accommodate simple engageable connectors such as those referred to as push-to-connect connectors 50 (not shown), known in the art. The push-to-connectconnectors 50 allow craftsmen to push the tubing lines into the connectors 50 with the various size tubing lines to engage to the lines to the connectors 50.

Further, if desired to cool air within the housing 12, a plurality of cooling fins 60 may be provided as shown in FIG. 5. The cooling fins would be located in the vicinity of first passageway 20 as first passageway 20 transfers hot compressed air directly from the air compressor 26.

Figure 6:
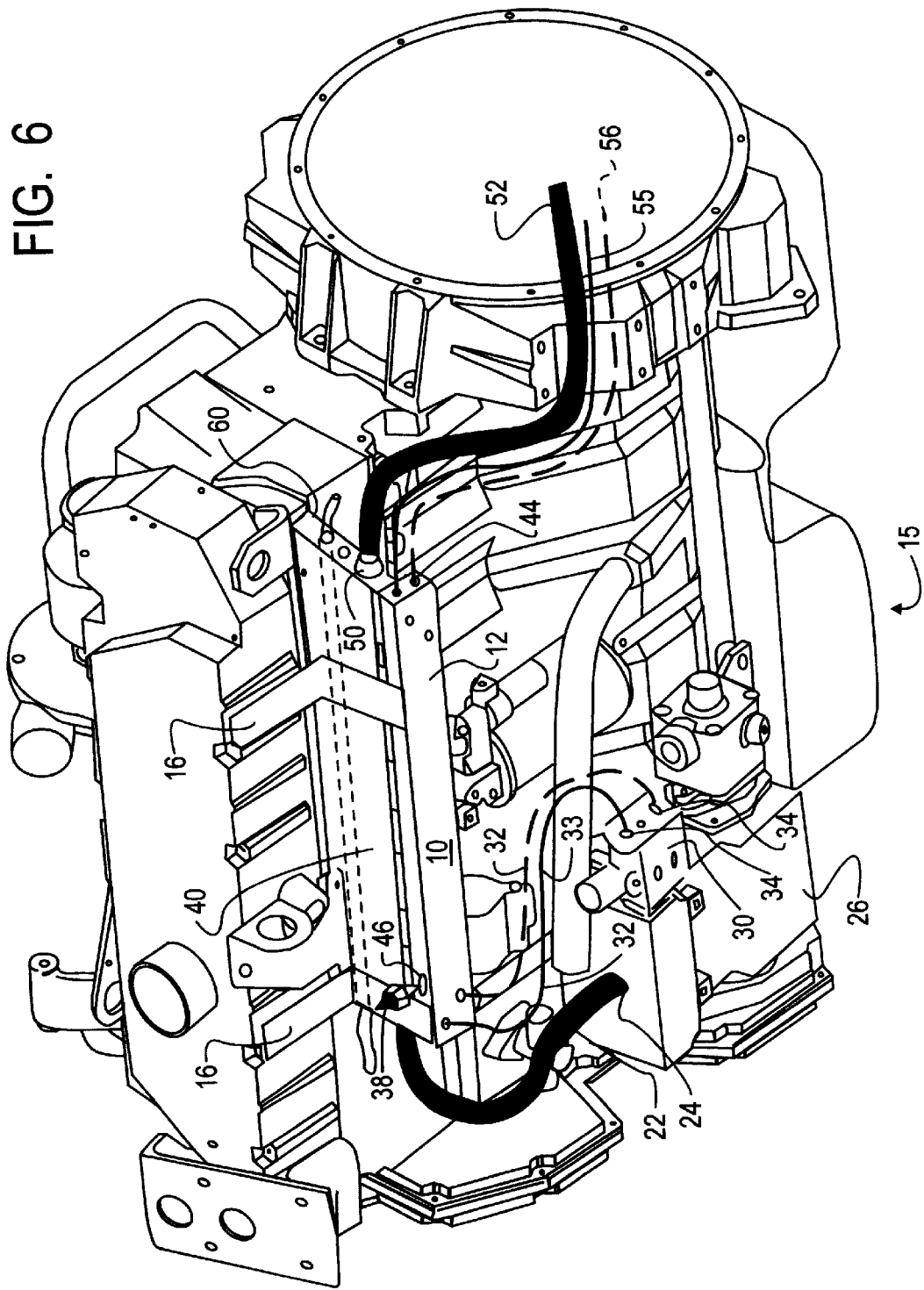
FIG. 6 is an enlarged perspective view of an air rail including an optional air or fuel passageway therein.

FIG. 6 carries the potential of the air rail 10 one step further. In this FIG. the air rail 10 not only distributes air but also is shown to incorporate a fuel line 29 (shown in phantom). In this respect, the fuel line 29 would be created within the conduit 14 to extend along the length of the housing 12 at any suitable location. Also, the warm air being pumped through first passageway 20 in the conduit 14 could provide warming to the fuel in the fuel line, hence improving the viscosity of the fuel and improving overall engine efficiency during vehicle engine 15 warm-up. In the alternative, the passageway associated with fuel line 29 could be used as an additional secondary air supply to air-using devices of the vehicle 19.

Accordingly, it will be understood that the air rail 10 provides a simple, adaptable, time, labor and part saving means for supplying air to devices and systems requiring same, in a manner which is independent of the combustion air of a vehicle engine.

I claim:

1. In combination with a mobile vehicle with a brake reservoir and with an engine with combustion air passageways and including an air compressor, an air rail for use in supplying pressurized air from the air compressor to any of a plurality of air-using devices of the vehicle, comprising:
    a housing defining an air passageway conduit therein;
    said conduit having a plurality of conduit passageways running from a front portion of said housing through said conduit to a rear portion of said housing;
    a plurality of ports disposed in said housing providing access to said passageways;
    a first passageway of said conduit passageways being functionally engaged to a discharge outlet of the air compressor at said front portion of said housing;
    said first passageway being functionally engaged to the brake reservoir of the vehicle via a wet tank supply line at said rear portion of said housing;
    a second passageway of said conduit passageways being closed at said front portion of said housing and being functionally engaged to the brake reservoir of the vehicle at said rear portion of said housing;
    said second passageway having a plurality of outlet ports;
    each of said plurality of outlet ports engages a supply line to the selected air-using device; and
    said housing and said conduit passageways being functionally independent of the combustion air passageways of the engine.

2. The air rail of claim 1 further comprising brackets for mounting said housing to the engine of the vehicle.

3. The air rail of claim 1 wherein said housing is mounted to a frame rail of the vehicle.

4. The air rail of claim 2 wherein said outlet ports are configured to engage a connector of the type defined as a push-to-connect connector.

5. The air rail of claim 2 wherein one of said outlet ports from said second passageway is functionally connected to a low air pressure switch.

6. The air rail of claim 5 wherein said low pressure switch engaging outlet port is positioned in a top surface of said housing.

7. The air rail of claim 2 wherein a portion of said housing incorporates cooling fins thereon.

8. The air rail of claim 1 wherein said housing is cast integral with a component of the engine.

9. The air rail of claim 1 wherein each said outlet port is positioned as close as possible to the air-using device to which each said outlet port is connected.

10. The air rail of claim 2 wherein a third passageway of said conduit passageways comprises a fuel oil line within said conduit, said fuel oil line extending through said housing and having an inlet thereto and an outlet therefrom defined in said housing, said oil conduit being functionally connected to the engine.

11. The air rail of claim 10 wherein a portion of said housing incorporates cooling fins thereon.

12. The air rail of claim 11 wherein said first passageway extends through said housing in the vicinity of said cooling fins.

13. The air rail of claim 1 wherein a fourth passageway of said conduit passageways is functionally connected at said rear portion of said housing to an unloader line leading to an air dryer and said fourth passageway is functionally connected at said front portion of said housing to a governor on the air compressor to cause the air dryer to expel moisture upon cycling of the air compressor.

14. The air rail of claim 1 wherein a second outlet port of said outlet ports from said second passageway is provided at a position along said housing as close as possible to a governor of the air compressor and said second outlet port is functionally connected to the governor.

15. In combination with a mobile vehicle with a brake reservoir and with an engine with combustion air passageways and including an air compressor, an air rail for use in supplying pressurized air from the air compressor to any of a plurality of air-using devices of the vehicle, comprising:

a housing defining an air passageway conduit therein;

said conduit having a plurality of conduit passageways running from a front portion of said housing through said conduit to a rear portion of said housing;

a plurality of ports disposed in said housing providing access to said passageways;

a first passageway of said conduit passageways being functionally engaged to a discharge outlet of the air compressor at said front portion of said housing;

said first passageway being functionally engaged to the brake reservoir of the vehicle via a wet tank supply line at said rear portion of said housing;

a second passageway of said conduit passageways being closed at said front portion of said housing and being functionally engaged to the brake reservoir of the vehicle at said rear portion of said housing;

said second passageway having a plurality of outlet ports;

each of said plurality of outlet ports engages a supply line to the selected air-using device;

said housing and said conduit passageways being functionally independent of the combustion air passageways of the engine;

said housing is mounted to the engine of the vehicle;

said outlet ports are configured to engage a connector of the type defined as a push-to-connect connector; and each said outlet port is positioned as close as possible to the device to which each said outlet port is connected.

16. The air rail of claim 15 wherein a first of said outlet ports from said second passageway is functionally connected to a low air pressure switch.

17. The air rail of claim 16 wherein a second outlet port of said outlet ports from said second passageway is provided at a position along said housing as close as possible to a governor of the air compressor and said second outlet port is functionally connected to the governor.

18. The air rail of claim 17 wherein a third passageway of said conduit passageways comprises a fuel oil line within said conduit, said fuel oil line extending through said housing and having an inlet thereto and an outlet therefrom defined in said housing, said oil conduit being functionally connected to the engine.

19. The air rail of claim 18 wherein a portion of said housing incorporates cooling fins thereon.

20. The air rail of claim 19 wherein said first passageway extends through said housing in the vicinity of said cooling fins.

21. The air rail of claim 20 wherein a fourth passageway of said conduit passageways is functionally connected at said rear portion of said housing to an unloader line leading to an air dryer and said fourth passageway is functionally connected at said front portion of said housing to a governor on the air compressor to cause the air dryer to expel moisture upon cycling of the air compressor.

* * * * *